(12) United States Patent
Sakamoto et al.

(10) Patent No.: US 7,277,152 B2
(45) Date of Patent: Oct. 2, 2007

(54) METHOD FOR MANUFACTURING ACTIVE MATRIX TYPE LIQUID CRYSTAL DISPLAY DEVICE COMPRISING ANNEALING OF THE PASSIVATION FILM

(75) Inventors: Michiaki Sakamoto, Tokyo (JP); Yuichi Yamaguchi, Tokyo (JP)

(73) Assignees: NEC Corporation (JP); NEC LCD Technologies, Ltd. (JP)

( * ) Notice: Subject to any disclaimer, the term of this patent is extended or adjusted under 35 U.S.C. 154(b) by 336 days.

(21) Appl. No.: 10/173,897

(22) Filed: Jun. 18, 2002

(65) Prior Publication Data

US 2003/0007106 A1    Jan. 9, 2003

(30) Foreign Application Priority Data

Jun. 22, 2001    (JP)    ............... 2001-189873

(51) Int. Cl.
G02F 1/13    (2006.01)
G02F 1/136    (2006.01)
G02F 1/1333    (2006.01)

(52) U.S. Cl. ............ 349/187; 349/43; 349/122; 349/138

(58) Field of Classification Search ......... 349/122, 349/138, 43; 438/30
See application file for complete search history.

(56) References Cited

U.S. PATENT DOCUMENTS

| 5,287,205 | A | * | 2/1994 | Yamazaki et al. | 349/174 |
| 5,721,601 | A | * | 2/1998 | Yamaji et al. | 349/138 |
| 5,815,223 | A | * | 9/1998 | Watanabe et al. | 349/42 |
| 5,817,549 | A | * | 10/1998 | Yamazaki et al. | 438/166 |
| 5,943,107 | A | * | 8/1999 | Kadota et al. | 349/44 |
| 5,950,077 | A | * | 9/1999 | Ohue et al. | 438/149 |
| 5,963,285 | A | * | 10/1999 | Kim | 349/122 |
| 5,969,377 | A | * | 10/1999 | Seo | 257/72 |
| 6,017,806 | A | * | 1/2000 | Harvey | 438/475 |
| 6,136,624 | A | * | 10/2000 | Kemmochi et al. | 438/30 |
| 6,243,146 | B1 | * | 6/2001 | Rho et al. | 349/42 |
| 6,249,330 | B1 | * | 6/2001 | Yamaji et al. | 349/122 |
| 6,277,678 | B1 | * | 8/2001 | Lee | 438/151 |

(Continued)

FOREIGN PATENT DOCUMENTS

JP    08-015731    1/1996

(Continued)

OTHER PUBLICATIONS

Marcovitch et al "transparent conductive indium oxide film deposited on low temperature substrates by activated readctive evaporation", Applied Optics vol. 28, No. 14, Jul. 15, 1989.*

*Primary Examiner*—Andrew Schechter
*Assistant Examiner*—W. Patty Chen
(74) *Attorney, Agent, or Firm*—Hayes Soloway P.C.

(57) ABSTRACT

A TFT and a passivation film are formed on a transparent substrate and thereafter the passivation film is annealed. When measuring drain currents of a TFT at a fixed turn-on voltage (Von) and a fixed turn-off voltage (Voff), although performance of a TFT annealed (solid line) rarely changes, performance of a TFT not annealed (dashed line) changes to a large extent, in more detail, drain current drastically decreases in accordance with the change of TFT performance. This phenomenon means that on-resistance of a TFT not annealed is being increased to a great extent.

10 Claims, 9 Drawing Sheets

U.S. PATENT DOCUMENTS

| | | | |
|---|---|---|---|
| 6,284,558 B1 * | 9/2001 | Sakamoto | 438/30 |
| 6,359,672 B2 * | 3/2002 | Gu et al. | 349/138 |
| 6,533,965 B1 * | 3/2003 | Sasaki et al. | 252/519.5 |
| 6,556,257 B2 * | 4/2003 | Ino | 349/43 |
| 6,566,174 B1 * | 5/2003 | Takechi et al. | 438/149 |
| 6,593,591 B2 * | 7/2003 | Yudasaka et al. | 257/57 |
| 6,632,478 B2 * | 10/2003 | Gaillard et al. | 427/255.37 |
| 2002/0006689 A1 * | 1/2002 | Miyasaka | 438/149 |

FOREIGN PATENT DOCUMENTS

| | | |
|---|---|---|
| JP | 2001-007335 | 1/2001 |
| JP | 2001-085701 | 3/2001 |
| JP | 2001-094115 | 4/2001 |
| JP | 2001-119029 | 4/2001 |
| KR | 1996-0042173 | 12/1996 |
| KR | 2000-00031 10 | 1/2000 |
| KR | 2001-0066349 | 7/2001 |
| WO | WO97/43689 | 11/1997 |

* cited by examiner

METHOD FOR MANUFACTURING ACTIVE MATRIX TYPE LIQUID CRYSTAL DISPLAY DEVICE COMPRISING ANNEALING OF THE PASSIVATION FILM

BACKGROUND OF THE INVENTION

1. Technical Field of the Invention

The present invention relates to a method for manufacturing an active matrix type liquid crystal display device that can suitably be employed in a portable telephone, a portable information terminal and the like. More particularly, it relates to a method for manufacturing an active matrix type liquid crystal display device that is able to prevent deterioration of images displayed thereon.

2. Description of the Related Art

An active matrix type liquid crystal display device comprises, for example, a TFT substrate using a thin film transistor (TFT) (formed in each pixel), as a switching element an opposing substrate adhered to the TFT substrate and a liquid crystal layer interposed between the TFT substrate and the opposing substrate.

FIG. 1 is a layout diagram illustrating a construction of a TFT substrate employed in a conventional liquid crystal display device and FIG. 2 is a cross sectional view indicating a positional relationship between the TFT substrate and an opposing substrate of the conventional liquid crystal display device. Note that the liquid crystal display devices shown in FIGS. 1 and 2 are not the same one, but are different from each other in, for example, the geometric shape of a source electrode.

In a conventional liquid crystal display device, a liquid crystal layer 33 is formed between transparent substrates 1 and 21. Hereinafter, the sides of the transparent substrates 1 and 21 on which the liquid crystal layer 33 is disposed will be referred to as "inner side" and the sides thereof on which the liquid crystal layer is not disposed will be referred to as "outer side."

On an inner side surface of the transparent substrate 1 a gate electrode 3 connected to a scanning line 2 and a gate insulation film 4 covering the gate electrode 3 are formed. A semiconductor layer 5 is formed on the gate insulation film 4 so as to face the gate electrode 3. Further, a drain electrode 7 and a source electrode 8 are formed on the gate insulation film 4 interposing the semiconductor layer therebetween, thereby constituting a thin film transistor (TFT) 10. Note that the drain electrode 7 is connected to a data line 6 that extends in a direction perpendicular to the scanning line 2.

A passivation film 9 and an overcoat layer 11 are formed covering the above-described components. Furthermore, a contact hole 12 is formed in the passivation film 9 and the overcoat layer 11, and a pixel electrode 13 connected to the source electrode 8 via the contact hole 12 in each pixel is formed on the overcoat layer 11. In order to prevent leakage of light through the peripheries of the pixel electrode 13, the pixel electrode 13 is formed to overlap two adjacent scanning lines 2, 2 and two adjacent data lines 6, 6 in its peripheral portions when viewing the substrate from a position vertical to the transparent substrate 1, the two adjacent scanning and two adjacent data lines surrounding the pixel corresponding to the pixel electrode 13. Moreover, an alignment film (not shown) is formed on the pixel electrode 13, thereby constituting a TFT substrate 31.

On the other hand, on an inner side surface of the transparent substrate 21 are formed a color filters 22 corresponding to each of colors to be displayed and a black matrix 23. Further, a common electrode 24 and an alignment layer (not shown) are successively formed on the transparent substrate 21 on an inner side with respect to the color filter and the black matrix, thereby constituting an opposing substrate 32.

It should be noted that in FIG. 2, the source electrode 8 is formed to extend in the vicinity of a pixel adjacent to the pixel containing the source electrode 8. And the scanning line 2 is constructed such that a straight-line portion of the scanning line extending in one direction and another portion thereof projecting from the straight line portion in a direction opposite to the direction in which the gate electrode 3 projects from the straight-line portion and overlapping the source electrode 8 via the gate insulation film 4 are formed to constitute the scanning line. On the other hand, in FIG. 2, the source electrode 8 is formed only in the vicinity of the gate electrode 3 of the TFT 10. As described above, the pixel constructions shown in FIGS. 1 and 2 are a little bit different from one another in terms of structure of a source electrode. That is, a portion of the scanning line 2, which overlaps the source electrode 8, is formed to securely make capacitance between the source electrode 8 and the scanning line 2 large enough to suppress undesirable fluctuation of potential of the source electrode 8 thereby preventing the displayed image from flickering.

A method of manufacturing a conventional TFT substrate will be explained below. FIGS. 3A to 3C and FIGS. 4A, 4B are cross sectional views of a conventional TFT substrate, illustrating a method for manufacturing the conventional TFT substrate in order of process steps. Note that a portion of a pixel shown in each of FIGS. 3A to 3C and FIGS. 4A, 4B corresponds to the portion of a pixel shown in FIG. 2.

As shown in FIG. 3A, first, on a transparent substrate 1 are selectively formed a scanning line 2 (refer to FIGS. 3 and 4) and a gate electrode 3. Then, a gate insulation film 4 is deposited using CVD on an entire surface of the transparent substrate 1. Thereafter, on the gate insulation film 4 a semiconductor layer 5 is formed. Subsequently, a data line 6, a drain electrode 7 and a source electrode 8 are formed on the gate insulation film 4.

As shown in FIG. 3B, a passivation film 9 is formed using plasma CVD on an entire surface of the transparent substrate 1.

As shown in FIG. 3C, an opening 9a is formed in the passivation film 9 so as to reach the source electrode 8.

As shown in FIG. 4A, an organic film, as an overcoat layer 11 having an opening 11a therein that reaches the opening 9a, is formed on the passivation film 9. The openings 9a and 11a constitute a contact hole 12.

As shown in FIG. 4B, a pixel electrode 13 connected to the source electrode 8 via the contact hole 12 is formed on the overcoat layer 11.

Thereafter, an alignment film (not shown) is formed covering the pixel electrode 13, thereby completing formation of TFT substrate.

In general, when a TFT is heated, on-resistance of the TFT is lowered while a ratio of off-resistance thereof with respect to on-resistance thereof is lowered and therefore, heating of TFT has been avoided.

According to the above-described method for manufacturing a conventional TFT substrate, although it is possible to obtain an active matrix type liquid crystal display device capable of displaying relatively high-quality images, it has been found that there are problems associated with the above-described display device. For example, non-uniformity in a display is observed or the contrast in the display degrades after using the device over a long period of time.

SUMMARY OF THE INVENTION

An object of the present invention is to provide a method for manufacturing an active matrix type liquid crystal display device capable of achieving high quality of images to be displayed over a long period of time.

A method for manufacturing an active matrix type liquid crystal display device constructed in accordance with one aspect of the present invention comprises the steps of:

forming a thin film transistor on a transparent substrate;

forming a passivation film covering the thin film transistor on the transparent substrate;

forming a first opening in the passivation film so as to reach a source electrode of the thin film transistor; and forming a pixel electrode connected to the source electrode via the first opening on the passivation film. In the method, the passivation film is annealed after the forming of the passivation film.

In this case, the annealing of the passivation film may be performed after the forming the pixel electrode.

A method for manufacturing an active matrix type liquid crystal display device constructed in accordance with another aspect of the present invention comprises the steps of:

forming a thin film transistor on a transparent substrate;

forming a passivation film covering the thin film transistor on the transparent substrate;

forming a first opening in the passivation film so as to reach a source electrode of the thin film transistor;

forming an organic film on the passivation film; forming a second opening in the organic film so as to be aligned with the first opening; and forming a pixel electrode connected to the source electrode via the first and second openings on the organic film. In the method, the passivation film is annealed after the forming of the passivation film.

In this case, the annealing of the passivation film may be performed between the forming of the first opening and the forming of the organic film.

Furthermore, in both the one and the another aspect of the present invention, the method is further constructed such that the annealing of the passivation film is performed before the forming of the first opening, and in this case, the extent to which the source electrode is oxidized can be kept low.

Moreover, in the another aspect of the present invention, the method further has a step for removing an oxide film existing in a surface of the source electrode and exposed through the second opening between the forming of the second opening and the forming of the pixel electrode, and in this case, contact resistance between the pixel electrode and the source electrode can be made extremely low.

A method for manufacturing an active matrix type liquid crystal display device constructed in accordance with still another aspect of the present invention comprises the steps of:

forming a thin film transistor on a transparent substrate;
forming a passivation film covering the thin film transistor on the transparent substrate;

forming an organic film on the passivation film;

forming a second opening in the organic film so as to be aligned with a source electrode of the thin film transistor;

forming a first opening in the passivation film so as to reach the source electrode of the thin film transistor; and forming a pixel electrode connected to the source electrode via the first and second openings on the organic film. In the method, the passivation film is annealed after the forming of the passivation film.

The method may be further constructed such that the annealing of the passivation film is performed before the forming of the organic film and in this case, the source electrode is rarely oxidized, thereby making contact resistance between the pixel electrode and the source electrode extremely low.

DETAILED DESCRIPTION OF THE PREFERRED EMBODIMENTS

Figure 1:
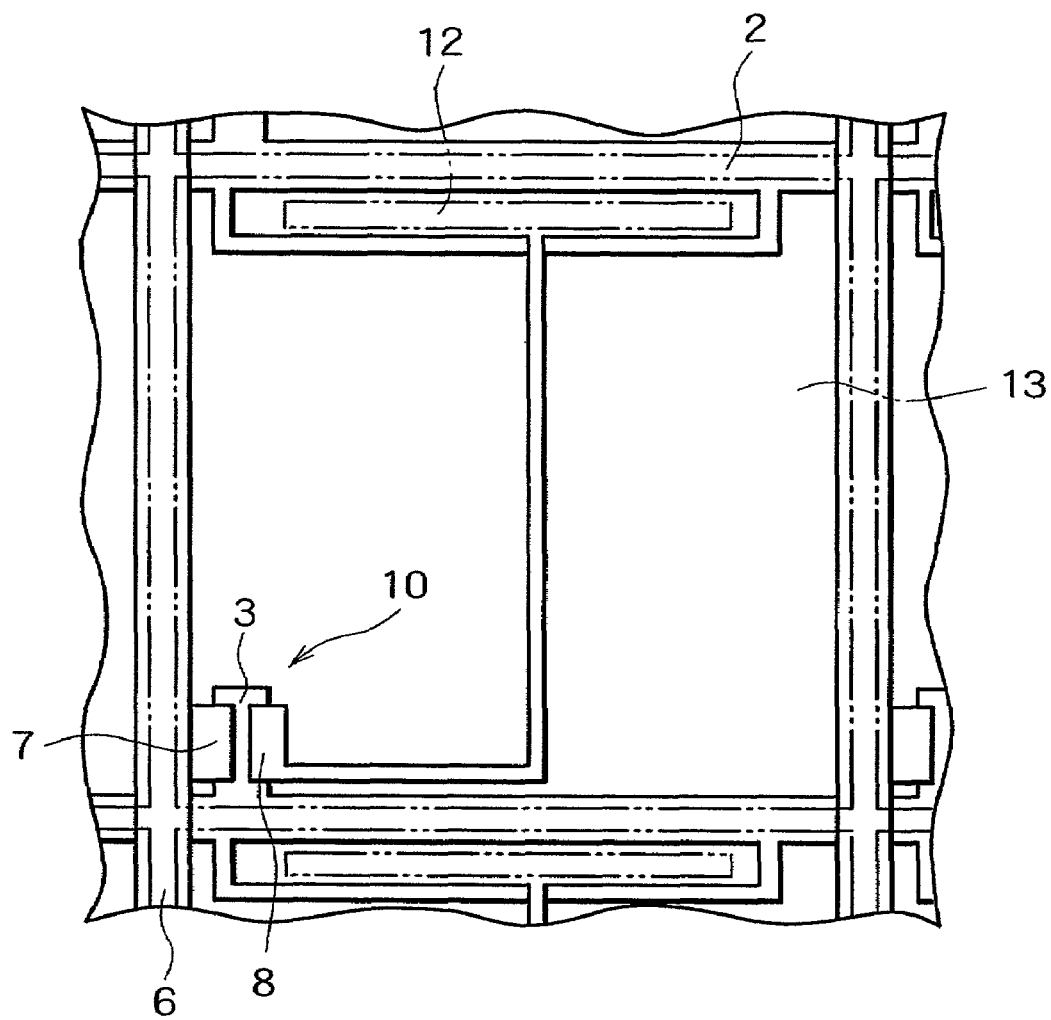
FIG. 1 is a layout diagram illustrating a structure of a TFT substrate of a conventional liquid crystal display device.
Figure 2:
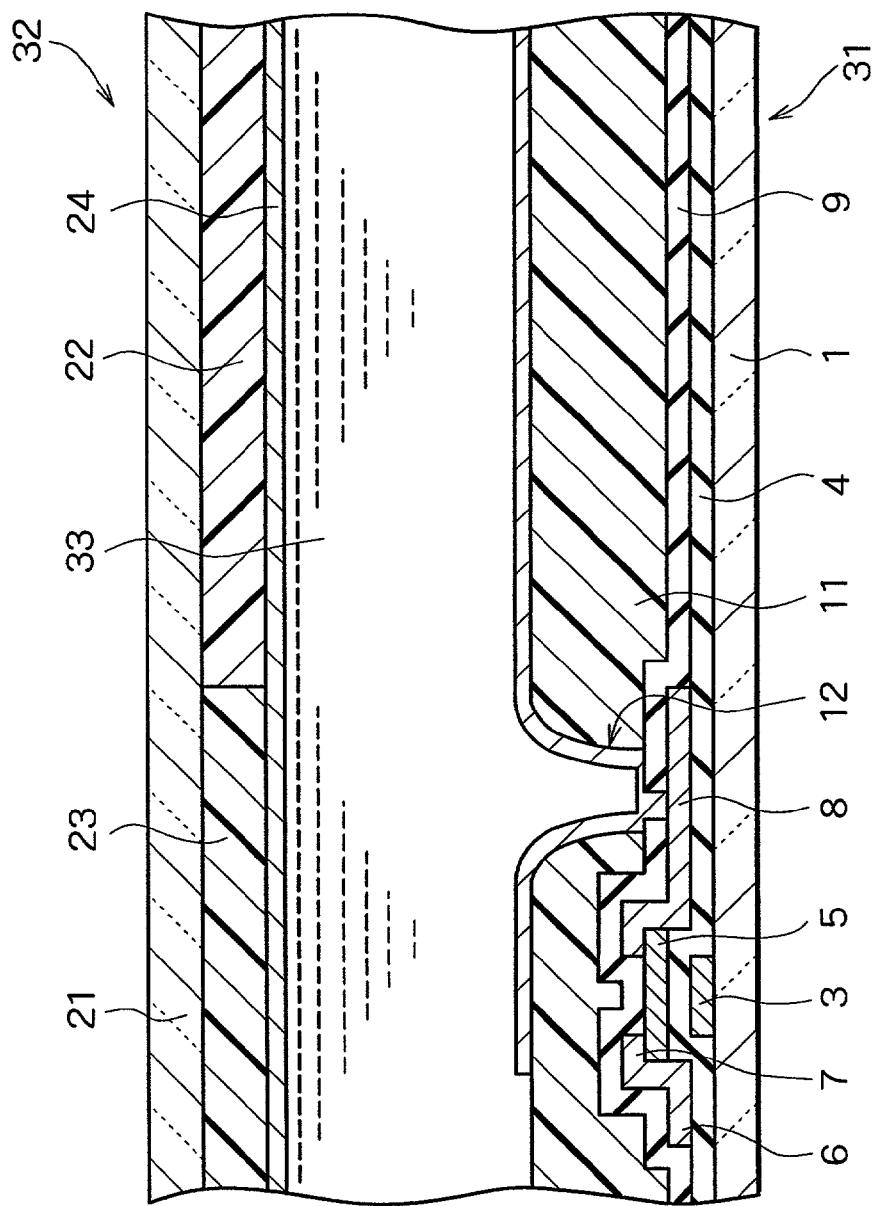
FIG. 2 is a cross sectional view of the conventional liquid crystal display device, illustrating a positional relationship between the TFT substrate and an opposing substrate.

A method for manufacturing an active matrix type liquid crystal display device constructed in accordance with embodiments of the present invention will be explained in detail below with reference to the accompanying drawings. FIGS. 5A to 5C and FIGS. 6A, 6B are cross sectional views of an active matrix type liquid crystal display device constructed in accordance with a first embodiment of the present invention, illustrating a method for manufacturing an active matrix type liquid crystal display device in order of process steps. Note that a portion of a pixel shown in each of FIGS. 5A to 5C and FIGS. 6A, 6B corresponds to the portion of a pixel shown in FIG. 2.

Figure 3A:
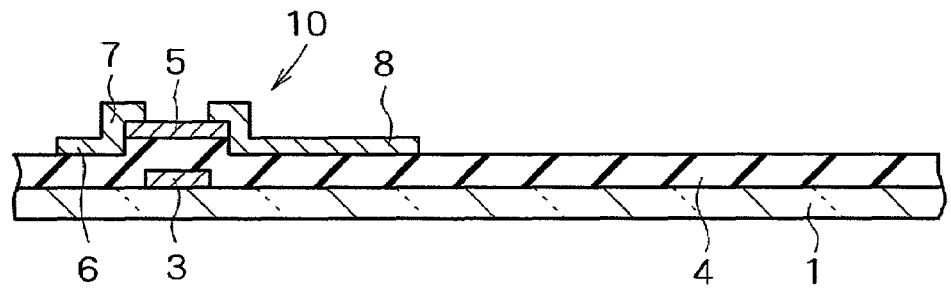
FIGS. 3A through 3C are cross sectional views of the TFT substrate, illustrating a method for manufacturing a conventional TFT substrate in order of process steps.
Figure 3B:
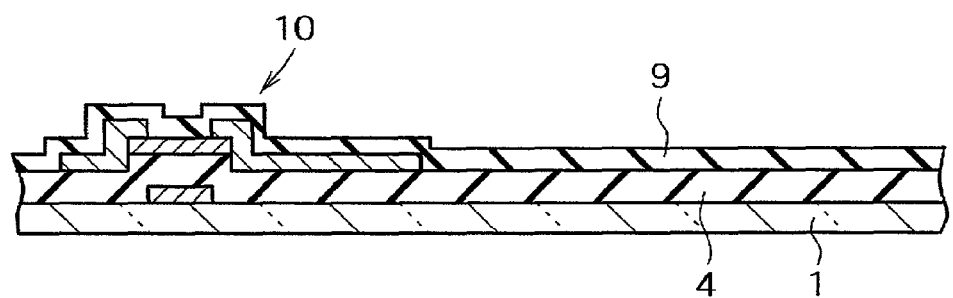
Figure 3C:
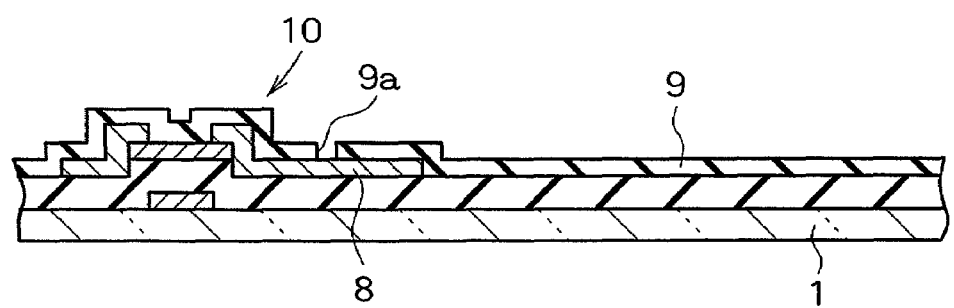
Figure 4A:
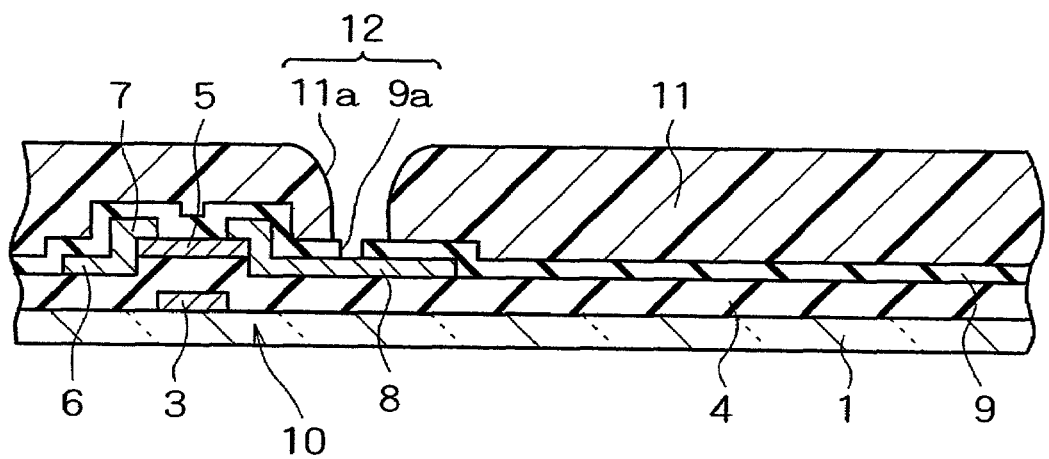
FIGS. 4A and 4B also are cross sectional views of the TFT substrate, illustrating process steps subsequent to the process steps of FIGS. 3A through 3C in order of process steps.
Figure 4B:
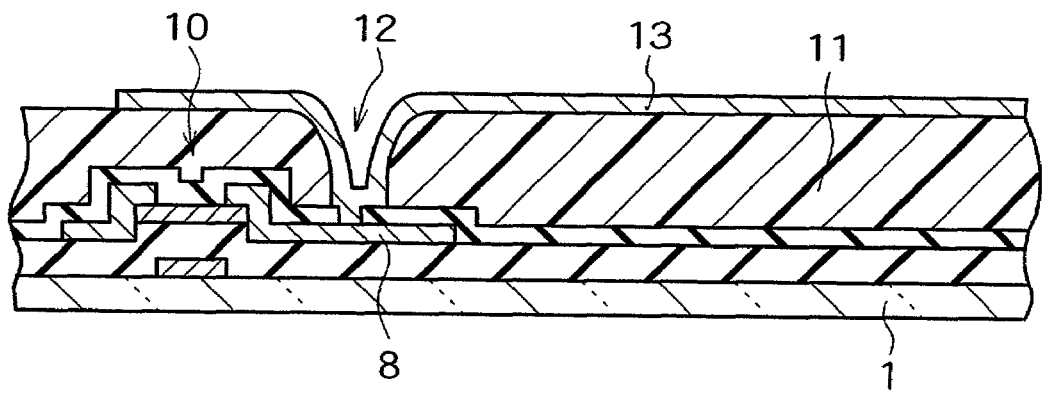

In the first embodiment a transparent substrate, e.g., a glass substrate or a transparent resin substrate, is deposited a metal film such as an aluminum (Al) film, a molybdenum (Mo) film or a chromium (Cr) film is deposited thereon using e.g., a chemical vapor deposition (CVD) method. Then, the metal film is selectively etched using photolithography to form a desired pattern in the metal film, thereby forming a scanning line 2 (refer to FIGS. 3 and 4) and a gate electrode 3. In this case, the scanning line 2 and the gate electrode 3 are formed to have a film thickness of, for example, 100 to 400 nm. Then, on an entire surface of the substrate, a gate insulation film 4 consisting of e.g., a silicon nitride film is deposited using, for example, a CVD method. The gate insulation film 4 is formed to have a film thickness of, for example, 100 to 200 nm. Thereafter, on the gate insulation film 4 is deposited an amorphous silicon film and the amorphous silicon film is selectively etched to form a desired pattern in the amorphous silicon film, thereby forming a semiconductor layer 5. The semiconductor layer 5 is formed to have a film thickness of, for example, about 400 nm. Subsequently, on an entire surface of the substrate is deposited a metal film such as an aluminum (Al) film, a molybdenum (Mo) film or a chromium (Cr) film by using, for example, a sputtering method. Then, the metal film is selectively etched using photolithography to form a desired pattern in the metal film, thereby forming a data line 6, a drain electrode 7 and a source electrode 8. In this case, the data line 6, the drain electrode 7 and the source electrode 8 are formed to have a film thickness of, for example, 100 to 400 nm. Finally, a thin film transistor (TFT) 10 is formed through the above-described process steps.

Figure 5A:
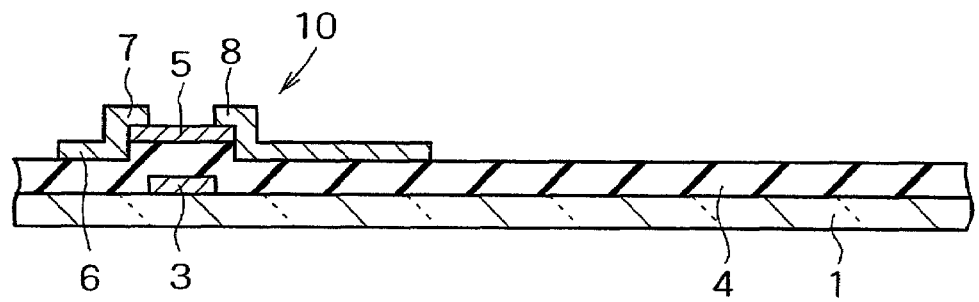
FIGS. 5A through 5C are cross sectional views of a TFT substrate, illustrating a method for manufacturing an active matrix type liquid crystal display device constructed in accordance with a first embodiment of the present invention in order of process steps.
Figure 5B:
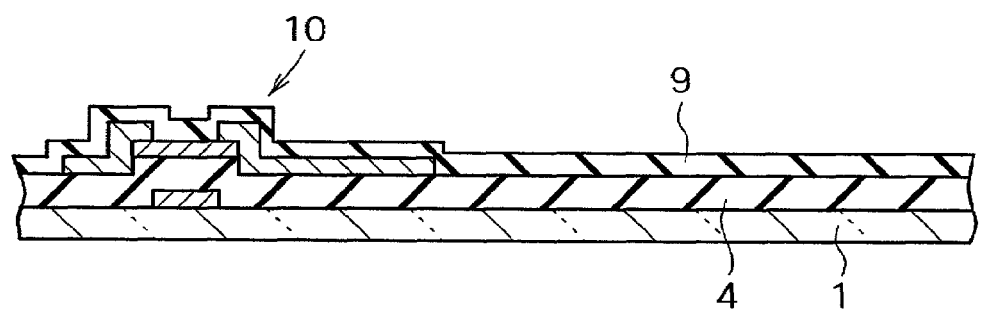

As shown in FIG. 5B, a passivation film 9 is deposited using plasma CVD on an entire surface of the substrate. In this case, the passivation film 9 consists of a non-organic film such as a $SiN_x$ film or a transparent resin film such as an epoxy resin film or an acrylic resin film and is deposited to have a film thickness of, for example, 100 to 200 nm. Subsequently, the passivation film 9 is annealed for example, in an air or an $N_2$ atmosphere. In an exemplary case, the annealing was performed for about one hour at a temperature of 250 to 270° C.

Figure 5C:
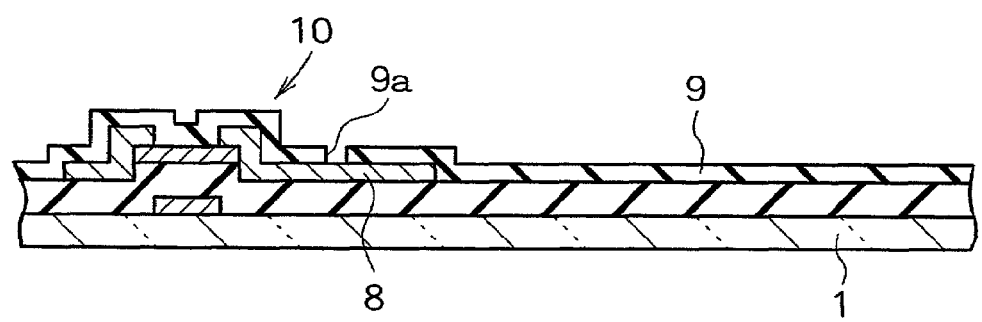

As shown in FIG. 5C, an opening 9a is formed in the passivation film 9 so as to reach the source electrode 8.

Figure 6A:
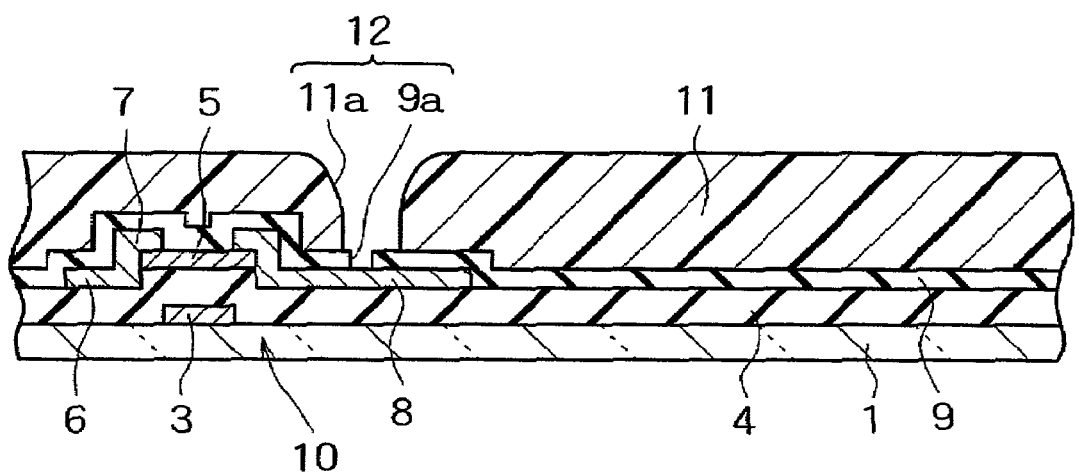
FIGS. 6A and 6B also are cross sectional views of the TFT substrate constructed in accordance with the first embodiment of the present invention, illustrating process steps subsequent to the process step of FIG. 5C in order of process steps.

Subsequently, for example, a photosensitive acrylic resin film is coated on an entire surface of the substrate by using a spin coat method and then, exposed and developed to form a desired pattern in the photosensitive acrylic resin film. Then, the resin film is cured at a temperature of about 200° C. to form an organic film as an overcoat layer 11 having an opening 11a therein so as to reach the opening 9a, as shown in FIG. 6A. Thus, the openings 9a and 11a constitute a contact hole 12.

Figure 6B:
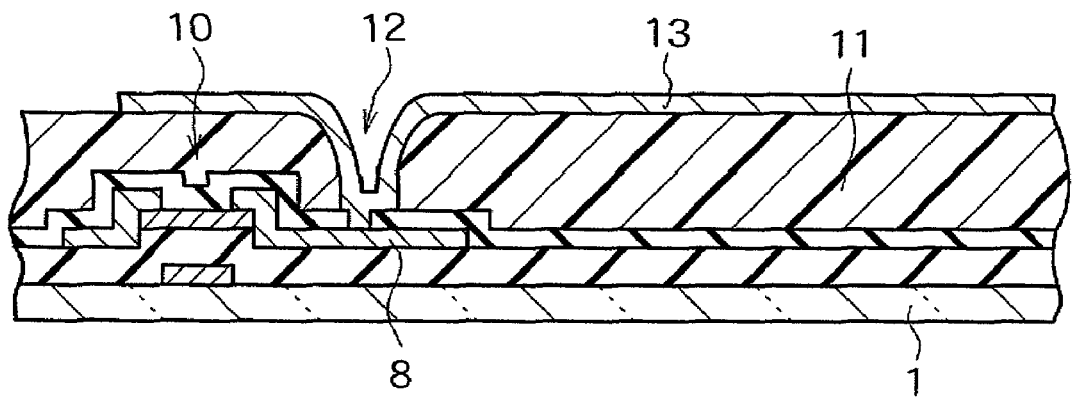

As shown in FIG. 6B, a conductive film is deposited using, for example, a sputtering method on the overcoat layer and the conductive film is selectively etched using photolithography to form a desired pattern in the conductive film, thereby forming a pixel electrode 13 connected to the source electrode 8 via the contact hole 12 in each pixel. In a case of a transmissive liquid crystal display device, the pixel electrode 13 consists of, for example, an Indium-Tin-Oxide (ITO) film and in a case of a reflective liquid crystal display device, the pixel electrode 13 consists of, for example, an Al film, and further, in a case of a semi-transmissive liquid crystal display device having a transmissive display section and a reflective display section in each pixel, the pixel electrode 13 consists of an ITO film and an Al film partially overlapping each other. Note that the conductive film is preferably deposited at a temperature of 100 to 150° C. The reason is that when the conductive film is deposited at a temperature lower than 100° C., a contact resistance between the conductive film and the source electrode becomes high and when the conductive film is deposited at a temperature higher than 150° C., oxygen diffuses from the organic film, which constitutes the overcoat layer 11, into the conductive film and therefore, conductive film etching becomes difficult.

Thereafter, an alignment film (not shown) is formed covering the pixel electrode 13 to thereby complete formation of a TFT substrate.

After completing the formation of the TFT substrate, an opposing substrate having a color filter and a common electrode formed therein and the TFT substrate are adhered to each other and a liquid crystal is interposed therebetween to thereby complete formation of a liquid crystal panel. Furthermore, chips such as a data driver chip are provided together with the liquid crystal panel to complete formation of an active matrix type liquid crystal display device.

According to the first embodiment constructed as described above, since the TFT 10 is annealed after forming the passivation film 9 and before forming the opening 9a, on-resistance of TFT is a little bit lowered while characteristic of the TFT 10, particularly, a ratio of off-resistance of TFT with respect to on-resistance thereof is advantageously stabilized when using the TFT over a long period of time. For example, in a case where annealing is not carried out, as in the case of the conventional method for manufacturing a liquid crystal panel, although a ratio of off-resistance of TFT with respect to on-resistance is of order about 6-digit before burn-in testing (continuous drive), the ratio of off-resistance of TFT with respect to on-resistance thereof gets down to be of order about 3-digit after burn-in testing. On the contrary, in a case where annealing is carried out as in the case of the method constructed in accordance with the embodiment, the ratio of off-resistance of TFT with respect to on-resistance thereof is maintained to be of order about 6-digit after burn-in testing.

The reason is as follows. The passivation film 9 is formed to protect the TFT 10 and consists of a $SiN_x$ film that is deposited by a plasma CVD method and locally contains ions and radicals left therein. Accordingly, polarization is observed in the passivation film 9 consisting of a $SiN_x$ film and the polarization affects back channel of the TFT. As a result, using TFT over a long period of time makes TFT performance change. That is, the ratio of off-resistance of TFT with respect to on-resistance thereof is lowered to a large extent after burn-in testing. On the contrary, in a case where the passivation film 9 is annealed, for example, for 1 to 3 hours at a temperature of 250 to 320° C., ions and radicals contained in the passivation film are made diffused to suppress polarization of the $SiN_x$ film. As a result, TFT performance is stabilized and therefore, the ratio of off-resistance of TFT with respect to on-resistance thereof is rarely changed before and after burn-in testing.

Figure 7A:
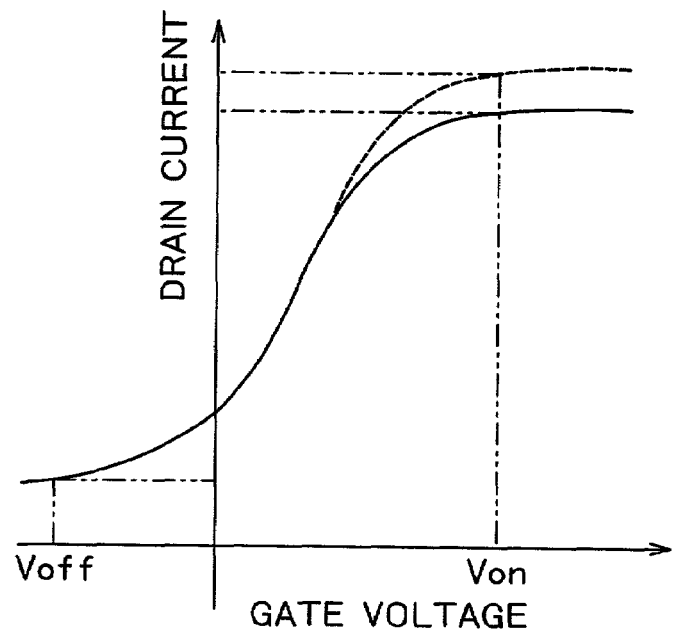
FIGS. 7A and 7B are graphs indicating TFT performance, in which axis of abscissas denotes a gate voltage and axis of ordinate denotes a drain current.
Figure 7B:
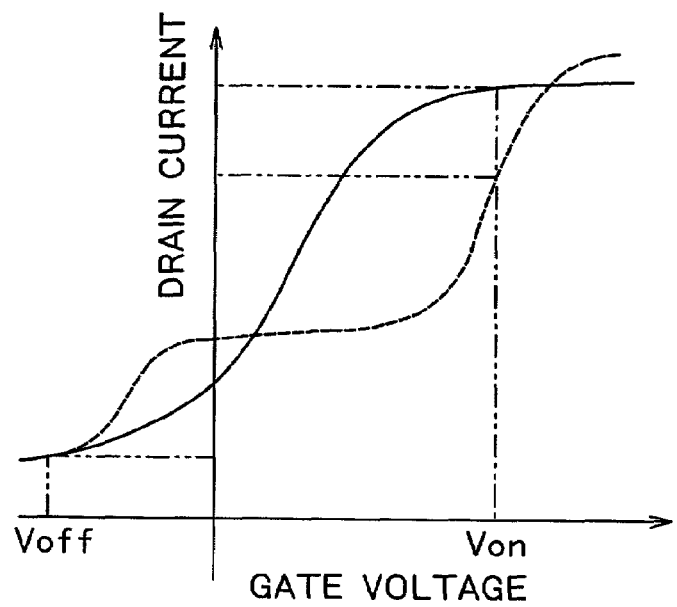

FIGS. 7A and 7B are graphs of TFT performance, in which axis of abscissas denotes a gate voltage and axis of ordinate denotes a drain current. Note that FIG. 7A illustrates TFT performance before burn-in testing and FIG. 7B illustrates the same after burn-in testing. In addition, a solid line in FIGS. 7A and 7B represents performance of a TFT annealed and a dashed line in FIGS. 7A and 7B represents performance of a TFT not annealed. As shown in FIGS. 7A and 7B, when measuring drain currents of a TFT at a fixed turn-on voltage (Von) and a fixed turn-off voltage (Voff), although performance of a TFT annealed (solid line) rarely changes, performance of a TFT not annealed (dashed line) changes to a large extent, in more detail, drain current drastically decreases in accordance with the change of TFT performance. This phenomenon means that on-resistance of a TFT that is not annealed is increased greatly.

A second embodiment of the present invention will be explained below. FIGS. 8A to 8C and FIGS. 9A, 9B are cross sectional views of an active matrix type liquid crystal display device constructed in accordance with the second embodiment of the present invention, illustrating a method for manufacturing an active matrix type liquid crystal display device in order of process steps. Note that a portion of a pixel shown in FIGS. 8A to 8C and FIGS. 9A, 9B also corresponds to the portion of a pixel shown in FIG. 2.

Figure 8A:
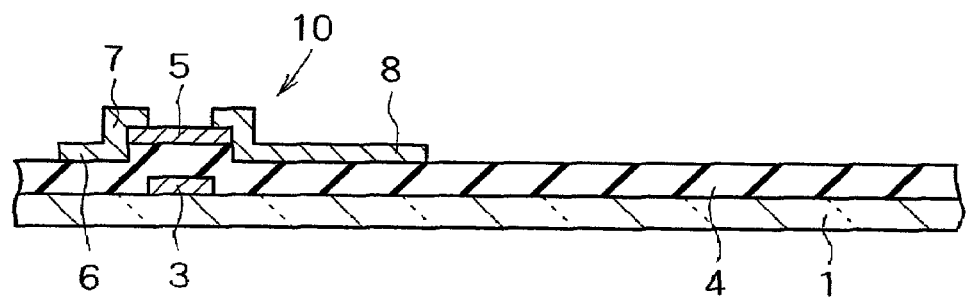
FIGS. 8A through 8C are cross sectional views of a TFT substrate, illustrating a method for manufacturing an active matrix type liquid crystal display device constructed in accordance with a second embodiment of the present invention in order of process steps.

In the second embodiment, shown in FIG. 8A, in accordance with process steps similar to those employed in the first embodiment, a scanning line 2 (refer to FIGS. 3 and 4), a gate electrode 3, a gate insulation film 4, a semiconductor layer 5, a data line 6, a drain electrode 7 and a source electrode 8 on a transparent substrate 1 to thereby form a TFT 10.

Figure 8B:
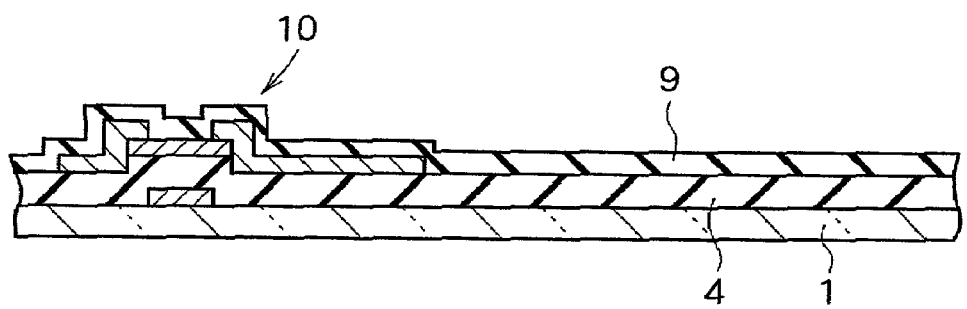

Thereafter, as shown in FIG. 8B, a passivation film 9 is formed using plasma CVD on an entire surface of the transparent substrate 1 and then, the passivation film 9 is annealed such as in an air or an $N_2$ atmosphere. In this case, the annealing is performed, for example, for about one hour at a temperature of 250 to 270° C.

Figure 8C:
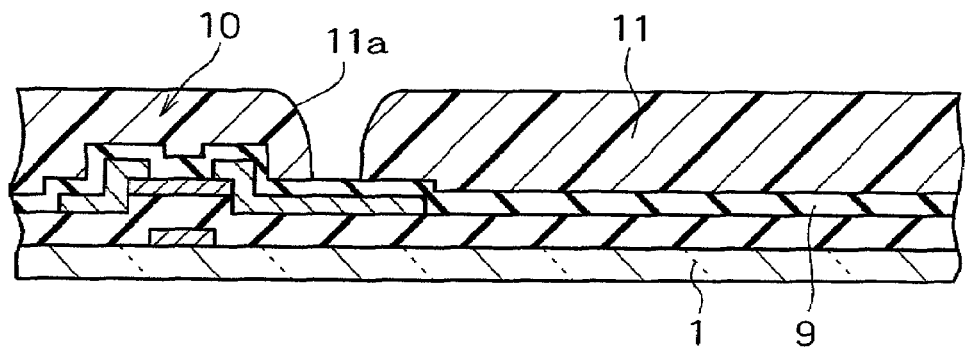

Thereafter, as shown in FIG. 8C, an overcoat layer 11 having an opening 11a therein so as to make the opening 11a aligned with, in other words, overlap the source electrode 8 when viewing the substrate from a position vertical to the transparent substrate 1 is formed on the passivation film 9.

Figure 9A:
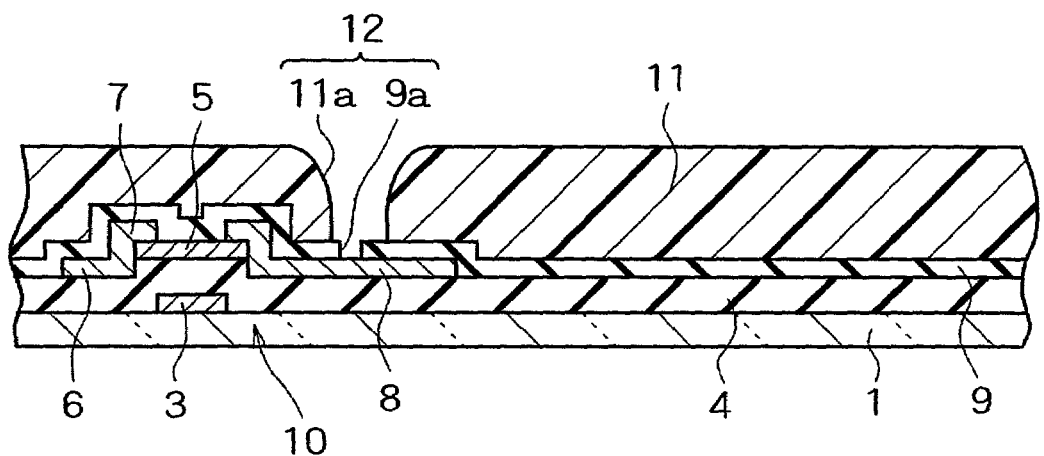
FIGS. 9A and 9B also are cross sectional views of the TFT substrate constructed in accordance with the second embodiment of the present invention, illustrating process steps subsequent to the process step of FIG. 8C in order of process steps.
Figure 9B:
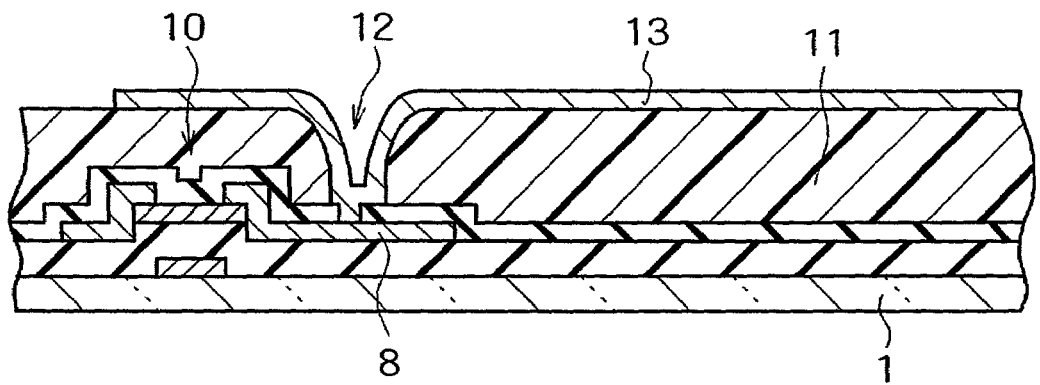

As shown in FIG. 9A, an opening 9a reaching the source electrode 8 is formed in a part of the passivation film 9, which part is exposed through the opening 11a. Thus, the openings 9a and 11a constitute a contact hole 12.

As shown in FIG. 8B, in accordance with process steps similar to those employed in the first embodiment, a pixel electrode 13 connected to the source electrode 8 via the contact hole 12 in each pixel is formed, for example, using a sputtering method on an overcoat layer 11.

Thereafter, an alignment film (not shown) is formed covering the pixel electrode 13 to thereby complete formation of a TFT substrate.

Then, an opposing substrate having a color filter, a common electrode and the like therein and the TFT substrate are adhered to each other, and further, a liquid crystal is enclosed within a space therebetween to compete formation of a liquid crystal panel. Furthermore, chips such as a data driver chip are provided together with the liquid crystal panel to complete formation of an active matrix type liquid crystal display device.

It should be noted that process conditions for depositing associated films and film thickness of associated films employed in the second embodiment are the same as those of the first embodiment.

In the second embodiment constructed as described above, since the opening 9a is formed in the passivation film 9 after formation of the overcoat layer 11, the surface of the source electrode 8 is rarely oxidized, allowing contact resistance between the source electrode 8 and the pixel electrode 13 to become extremely small. That is, in the first embodiment, since heat treatment (curing) is carried out to form the overcoat layer 11 after formation of the opening 9a, the surface of the source electrode 8 is oxidized to a small extent during the heat treatment. However, in the second embodiment, such oxidation of the source electrode never occurs, preventing increase in contact resistance.

It should be noted that in the first and second embodiments, although the overcoat layer 11, made of an organic film, is formed between the passivation film 9 and the pixel electrode 13, it is not necessarily required to form the overcoat layer 11 in the TFT substrate. As already described, the pixel electrode 13 is formed to partially overlap the data line 6 when viewing the substrate from a position vertical to the substrate to suppress light leakage through peripheries of the pixel electrode 13. For this reason, in a case where the overcoat layer 11 is not formed in the TFT substrate, the spacing between the pixel electrode 13 and the data line 6 becomes shorter followed by relatively large increase in capacitance therebetween and therefore, quality of images to be displayed deteriorates depending on the circumstances. In order to avoid such undesirable phenomenon, the overcoat layer 11 is formed so as to securely make the spacing between the pixel electrode 13 and the data line 6 wide to reduce capacitance therebetween. However, in a case where such reduction of capacitance is not particularly required, the pixel electrode 13 may be formed on the passivation film 9.

Additionally, in a case the overcoat layer 11 is not formed in the TFT substrate as described above, the passivation film 9 may be annealed after formation of the pixel electrode 13. The reason is as follows. That is, in a case where the overcoat layer 11 is formed in the TFT substrate, since the overcoat layer 11 made of an organic film can keep its desired performance at most at up to a temperature of about 220° C., when the passivation film 9 is annealed at a temperature of 250 to 320° C. after formation of the pixel electrode 13, the overcoat layer 11 deteriorates, and on the contrary, in a case where the overcoat layer 11 is not formed, such deterioration of the overcoat layer never occurs.

Moreover, in the first embodiment, although annealing is performed after formation of the passivation film 9 and before formation of the opening 9a, even in a case where annealing is performed after formation of the opening 9a and before formation of the overcoat layer 11, TFT performance can be made stable. It should be noted that in this case, since a part of the source electrode 8 is exposed to the outside during process step for annealing the passivation film 9, the exposed part of the source electrode 8 is oxidized to form an oxide film therein during the annealing in atmospheric air, increasing contact resistance of the source electrode. In such a case, it is preferable to remove the oxide film using, for example, reverse sputtering in Ar gas, dry etching in oxygen gas or the like after formation of the overcoat layer 11 having the opening 11a therein and before formation of the pixel electrode 13. Although such removal of the oxide film may be performed right after the annealing, since an oxide film is formed to a small extent in the associated part of the source electrode during formation of the overcoat layer 11, it is preferable to perform removal of the oxide film after formation of the overcoat layer 11. Also in the first embodiment, since an oxide film is formed to a small extent in the associated part of the source electrode during formation of the overcoat layer 11, it is preferable to perform removal of the oxide film after formation of the overcoat layer 11 and before formation of the pixel electrode 13.

In the first and second embodiments, although a case where an active matrix type liquid crystal display device in which a liquid crystal is made to rotate by an electric field generated between a common electrode formed in an opposing substrate and a pixel electrode formed in a TFT substrate is manufactured is exemplified, the present invention can be applied not only to such construction of liquid crystal display device but also to an active matrix type liquid crystal display device in which a common electrode and a pixel electrode are formed in a TFT substrate and a liquid crystal is made to rotate by a lateral electric field generated in parallel to the surface of the TFT substrate. In addition, the liquid crystal display device of the present invention may be constructed such that a color filter may be formed in a TFT substrate instead of an opposing substrate. Furthermore, a light emission performed in the present invention may be subjected to any one of transmissive, reflective and transmissive/reflective modes.

The inventors of the application manufactured active matrix type liquid crystal display devices changing process conditions as to, for example, which process step among an entire process steps should be assigned to the annealing and measured contact resistance between a pixel electrode and a source electrode, obtaining the following results.

The process conditions employed to manufacture the device will be indicated in table 1 and the contact resistance will be shown in table 2. Note that the source electrode is formed of a Cr film and the pixel electrode is formed of an Al-Mo alloy.

TABLE 1

| Example No. | Order of process steps | Position | Diameter |
|---|---|---|---|
| 1 | Form passivation film → Form opening in passivation film → Anneal → Form overcoat layer | Inside | 12 |
| 2 | Form passivation film → Anneal → Form opening in passivation film → Form overcoat layer | Outside | 12 |
| 3 | Form passivation film → Anneal → Form opening in passivation film → Form overcoat layer | Inside | 12 |
| 4 | Form passivation film → Anneal → Form overcoat layer → Form opening in overcoat layer → Form opening in passivation film | Inside | 12 |

An item "Position" in the table 1 indicates a positional relationship between an opening of a passivation film and an opening of an overcoat layer, and an item "outside (meaning one opening is located outside with respect to the other opening)" indicates the opening of the passivation film is larger than that of the overcoat layer, and an item "inside" indicates the opening of the overcoat layer is larger that that of the passivation film. In addition, an item "diameter" indicates the diameter of the opening of the passivation film.

TABLE 2

| Example No. | Contact resistance |
|---|---|
| 1 | 34.1 MΩ |
| 2 | several 10 kΩ to several MΩ |
| 3 | 4.4 kΩ |
| 4 | 0.2 kΩ |

As shown in table 2, the sample of example No. 4 corresponding to the second embodiment indicates a minimum value of contact resistance among examples in the table. Furthermore, since the sample of example No. 1 is annealed in atmospheric air in a situation where the source electrode is exposed to the outside, an oxide film thicker than those formed in the samples of other examples is formed in the surface of the source electrode of the sample of example No. 1, thereby indicating a high value of contact resistance in the sample of example No. 1. Moreover, as indicated by the values corresponding to the samples of examples No. 2 and No. 3, the sample having the opening of the overcoat layer larger than that of the passivation film indicates a value of contact resistance lower than that obtained in a case where the dimensional relationship between the above-stated two openings is inverted.

As described in detail so far, according to the present invention, annealing a passivation film prevents polarization of the passivation film and makes TFT performance stable. Therefore, high quality of images to be displayed can be obtained over a long period of time. In addition, in a case where annealing is performed in a process step preferably selected from among an entire process steps, oxidation of a source electrode can be suppressed, thereby keeping contact resistance between a pixel electrode and a source electrode low.

What is claimed is:

1. A method for manufacturing an active matrix type liquid crystal display device, comprising the steps of:
   forming a thin film transistor on a transparent substrate;
   forming a passivation film covering said thin film transistor on said transparent substrate;
   annealing said passivation film to diffuse ions and radicals in said passivation film;
   forming a first opening in said passivation film so as to reach a source electrode of said thin film transistor;
   forming a pixel electrode connected to said source electrode via said first opening on said passivation film, wherein said annealing of said passivation film is performed after said forming of said pixel electrode; and
   wherein said pixel electrode contacts a portion of said passivation film.

2. The method for manufacturing the active matrix type liquid crystal display device according to claim 1, wherein said annealing of said passivation film is performed before said forming of said first opening.

3. The method for manufacturing the active matrix type liquid crystal display device according to claim 2, further comprising a step of removing an oxide film existing in a surface of said source electrode and exposed through said first opening between said step for forming said first opening and said step for forming said pixel electrode.

4. The method of claim 1, wherein the step of annealing further comprises annealing the passivation film at a temperature of less than 350 degrees Celsius.

5. The method of claim 1, wherein the passivation film further comprises $SiN_x$.

6. A method for manufacturing an active matrix type liquid crystal display device, comprising the steps of:
   forming a thin film transistor on a transparent substrate;
   forming a passivation film covering said thin film transistor on said transparent substrate;
   annealing said passivation film to diffuse ions and radicals in said passivation film;
   forming a first opening in said passivation film so as to reach a source electrode of said thin film transistor;
   forming an organic film on said passivation film, wherein said annealing of said passivation film is performed between said forming of said first opening and said forming of said organic film;
   forming a second opening in said organic film so as to be aligned with said first opening; and forming a pixel electrode connected to said source electrode via said first and second openings on said organic film,
wherein said pixel electrode contacts a portion of said passivation film.

7. The method for manufacturing the active matrix type liquid crystal display device according to claim 6, wherein said annealing of said passivation film is performed before said forming of said first opening.

8. The method for manufacturing the active matrix type liquid crystal display device according to claim 7, further comprising a step of removing an oxide film existing in a surface of said source electrode and exposed through said second opening between said step for forming said second opening and said step for forming said pixel electrode.

9. The method for manufacturing the active matrix type liquid crystal display device according to claim 6, further comprising a step of removing an oxide film existing in a surface of said source electrode and exposed through said second opening between said step for forming said second opening and said step for forming said pixel electrode.

10. The method for manufacturing the active matrix type liquid crystal display device according to claim 6, wherein said annealing of said passivation film is performed before said forming of said organic film.

* * * * *